(12) United States Patent
Molsberry et al.

(10) Patent No.: US 8,462,799 B2
(45) Date of Patent: Jun. 11, 2013

(54) DISTRIBUTED APPLICATION COMMUNICATION ROUTING SYSTEM FOR INTERNET PROTOCOL NETWORKS

(75) Inventors: Launa B. Molsberry, Kent, WA (US); Charles D. Royalty, Bellevue, WA (US); Jeffery L. Toolson, Marysville, WA (US)

(73) Assignee: The Boeing Company, Chicago, IL (US)

(*) Notice: Subject to any disclaimer, the term of this patent is extended or adjusted under 35 U.S.C. 154(b) by 539 days.

(21) Appl. No.: 11/638,238

(22) Filed: Dec. 13, 2006

(65) Prior Publication Data

US 2008/0144617 A1 Jun. 19, 2008

(51) Int. Cl.
*H04L 12/56* (2006.01)
(52) U.S. Cl.
USPC .......... 370/401; 370/389; 370/392; 455/3.01; 709/238
(58) Field of Classification Search
None
See application file for complete search history.

(56) References Cited

U.S. PATENT DOCUMENTS

| | | | |
|---|---|---|---|
| 6,185,619 B1* | 2/2001 | Joffe et al. | 709/229 |
| 6,801,769 B1* | 10/2004 | Royalty | 455/431 |
| 6,990,531 B2* | 1/2006 | Vange | 709/240 |
| 7,006,472 B1* | 2/2006 | Immonen et al. | 370/332 |
| 7,031,286 B1* | 4/2006 | Hall et al. | 370/338 |
| 7,039,034 B2* | 5/2006 | Dick et al. | 370/338 |
| 7,239,632 B2* | 7/2007 | Kalavade et al. | 370/389 |
| 7,298,733 B2* | 11/2007 | Sakai et al. | 370/352 |
| 7,457,315 B1* | 11/2008 | Smith | 370/473 |
| 2002/0032006 A1* | 3/2002 | Nair et al. | 455/66 |
| 2002/0172174 A1* | 11/2002 | Dick et al. | 370/338 |
| 2002/0191575 A1* | 12/2002 | Kalavade et al. | 370/338 |
| 2003/0055975 A1* | 3/2003 | Nelson et al. | 709/227 |
| 2003/0093557 A1* | 5/2003 | Giraud et al. | 709/239 |
| 2003/0219035 A1* | 11/2003 | Schmidt | 370/478 |
| 2004/0205235 A1* | 10/2004 | Matsuhira | 709/238 |
| 2004/0243712 A1* | 12/2004 | Sakai et al. | 709/227 |
| 2005/0058149 A1* | 3/2005 | Howe | 370/428 |
| 2005/0094585 A1* | 5/2005 | Golden et al. | 370/310 |
| 2005/0220055 A1* | 10/2005 | Nelson et al. | 370/331 |
| 2006/0080451 A1* | 4/2006 | Eckert | 709/230 |
| 2006/0239282 A1* | 10/2006 | Dick et al. | 370/401 |
| 2006/0252422 A1* | 11/2006 | Kauffman et al. | 455/431 |
| 2007/0076608 A1* | 4/2007 | Samuel et al. | 370/230 |
| 2008/0069030 A1* | 3/2008 | Hirano et al. | 370/328 |

OTHER PUBLICATIONS

WAEA Internet Working Group (IWG), On Board Infrastructure Ad Hoc, "White Paper: On Board Infrastrucure Version 1.0", 2001, pp. 1-20.*

* cited by examiner

*Primary Examiner* — Andrew Chriss
*Assistant Examiner* — Salvador E Rivas
(74) *Attorney, Agent, or Firm* — Parsons Behle & Ltimer

(57) ABSTRACT

IP-based messages composed by distributed applications on-board an aircraft are routed to ground destinations through non-IP based communication interfaces that use packet data transmission. Addressable routing daemons resident in on-board computers are used to route messages from an on-board TCP/IP network to a selected communication interface. A communications management controller routes the messages to the communication interfaces by addressing the routing daemon associated with the communication interface selected to transmit the message.

26 Claims, 3 Drawing Sheets

DISTRIBUTED APPLICATION COMMUNICATION ROUTING SYSTEM FOR INTERNET PROTOCOL NETWORKS

TECHNICAL FIELD

This disclosure generally relates to communication systems for vehicles such as an aircraft, and deals more particularly with a system for selecting one of several available communication interfaces for use in transmitting IP-based messages from the aircraft to off-board locations.

BACKGROUND

Various systems on-board commercial and military aircraft transmit a variety of data to ground-based stations related to the operation and safety of the aircraft. For example, on-board health management function applications may send data to ground stations that may be used by maintenance personnel to prepare the aircraft for maintenance operations in advance of its arrival. The communication of such messages to ground stations is typically performed using a standard communication system known as ACARS (Aircraft Communication Addressing and Reporting System). ACARS is a digital data link system used to transmit short messages between aircraft and ground stations via any of various wireless communication interfaces, sometimes referred to as air-ground sub-networks, such as Swift-Broadband (SSB) SATCOM, or 802.11 wireless LANs. Each message comprises Short Burst Data (SBD) which is a format that utilizes data packets no greater than 1960 bytes in length, or about 220 characters. The messages may comprise a variety of information or data such as the maintenance information mentioned above, take-off times, location reports, passenger information, etc. The ACARS system uses an on-board communication management unit (CMU) which functions to route the messages to the appropriate destinations on the ground. ACARS utilizes a predefined protocol in which messages are assigned priorities and queued for delivery according to urgency, destination, etc.

The ACARS messaging system requires that the CMU have complete control over the communication interface used to transmit messages on a message-by-message basis. The ACARS messaging system is therefore incompatible with messages that are generated on-board using standard IP (Internet Protocol). For example, a number of client applications may be connected on-board the aircraft by a local area network (LAN) which uses IP-based file transfer such as a form of TCP/IP to communicate messages on the LAN. When it is desired to deliver one of these messages to a ground-based station, it is not possible to dictate a particular communication interface used to transmit the message, since routing is inherently governed by the protocol used by the network, rather than that specified by the clients.

Accordingly, there is a need for a communication routing system that allows routing of IP-based messages to ground destinations using packet based radio communications. Embodiments of the disclosure are directed towards satisfying this need.

SUMMARY

In one embodiment of the disclosure, a method is provided of transmitting messages from an aircraft to a ground station. The method may include the steps of: generating a message on-board the aircraft; associating a router with each of a plurality of communication interfaces; assigning an address to each of the routers; selecting one of the communication interfaces for use in transmitting the message from the aircraft to the ground station; sending the message to the address of the router associated with the selected communication interface; and, transmitting the message from the aircraft to the ground station using the selected communication interface.

In accordance with embodiment, a method is provided for transmitting messages from on-board a vehicle to an off-board location. The method may include the steps of: placing a message on an IP-based local area network (LAN) on-board the vehicle; selecting one of a plurality of communication interfaces for use in transmitting the message from the vehicle to the off-board location; sending the message over the LAN to an address of a router associated with the selected communication interface; routing the message to the selected communication interface; and, transmitting the message from the vehicle to the off-board location using the selected communication interface.

In accordance with still another embodiment, a communication system for an aerospace vehicle is provided which may include: a local area network (LAN) on-board the vehicle; at least one application on-board the vehicle connected to the LAN, the application generating messages to be delivered to the ground; a plurality of communication interfaces for delivering messages from the vehicle to the ground; a plurality of router daemons respectively associated with the communication interfaces and each operative for routing messages to the associated communication interface, each of the routing daemons having an address on the LAN; and, a communication manager for managing the delivery of the messages from the applications to the routing daemons based on the addresses of the routing daemons.

In accordance with a further embodiment, a system is provided for delivering messages from an aircraft to the ground. The system may include: an IP-based network on the aircraft using TCP/IP to transmit messages; at least one application coupled with the network and generating messages to be sent to the ground; a plurality of communication interfaces each operative for delivering messages from the aircraft to the ground; a controller on-board the aircraft for selecting one of the communication interfaces to be used to transmit a message from the application to the ground; and, a plurality of addressable routers respectively associated with the communication interfaces, the routers being addressable by the controller to route the message to an associated communication interface for transmission to the ground.

These and further features, aspects and advantages of the embodiments will become better understood with reference to the following illustrations, description and claims.

BRIEF DESCRIPTION OF THE ILLUSTRATIONS

DETAILED DESCRIPTION

Figure 1:
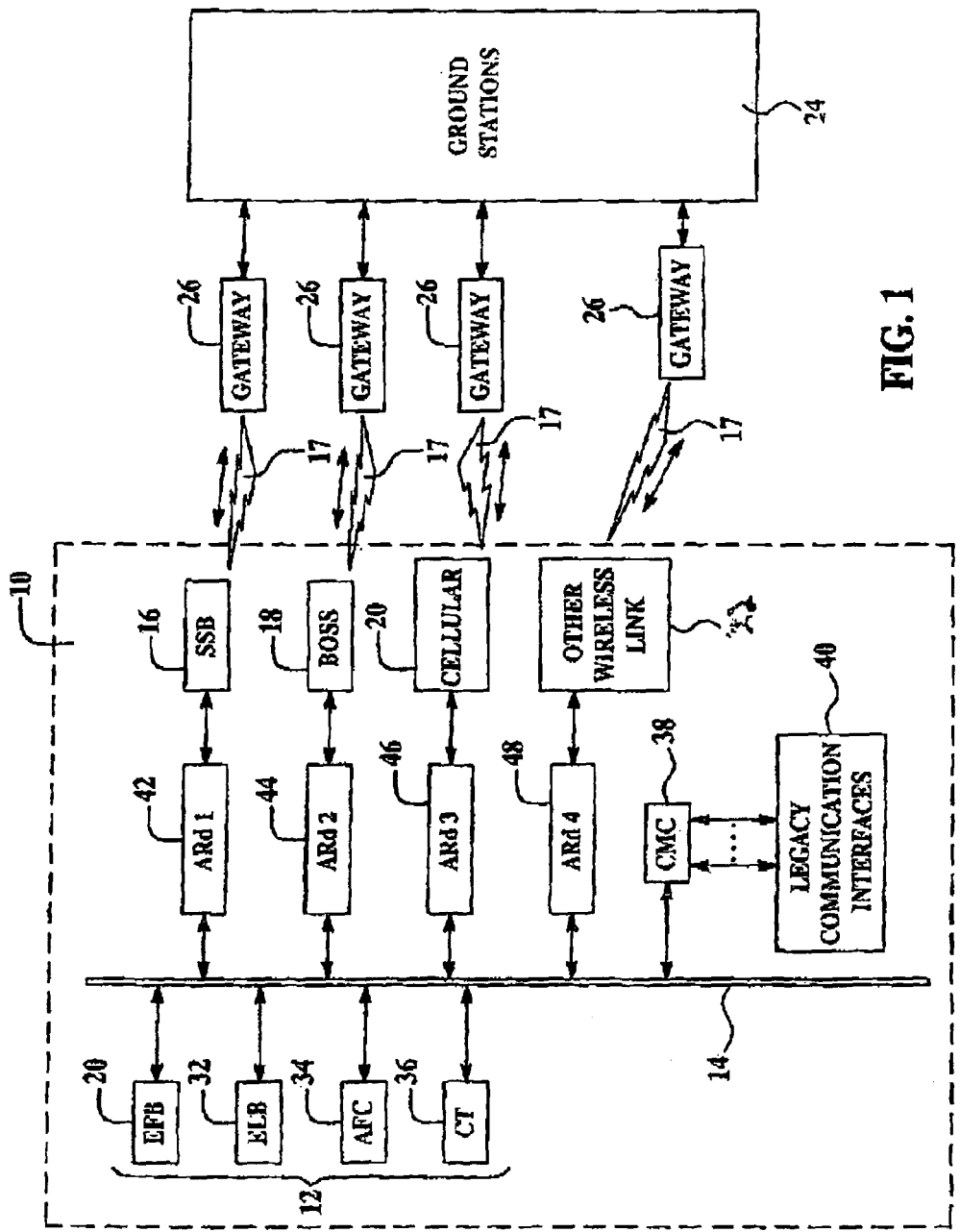
FIG. 1 is a simplified illustration of a communication routing system according to an embodiment of the disclosure, shown in relationship to ground stations.

Referring first to FIG. 1, an aircraft 10 or other vehicle such as, but not limited to a ship, a bus, or a spacecraft, includes an on-board local area network (LAN) 14 which may use TCP/

IP to link a plurality of client applications 12 for on-board network communication. TCP/IP means Transmission Control Protocol over Internet Protocol (IP). TCP is connection-oriented and stream-oriented, and provides for reliable communication over packet-switched networks. The client applications 12 may include, by way of example, an electronic flight bag (EFB) 20, electronic log book (ELB) 32, as flying configuration (AFC) records 34 and a cabin terminal (CT) 36. The aircraft 10 may include other client applications 12 such as a flight management system (not shown) or maintenance computer (not shown).

Each of the client applications 12 may send or receive messages using a routing system such as ACARS 17 between the aircraft 10 and one or more ground stations 24. The stations 24 may be connected to the Internet (not shown), giving the aircraft 10, and particularly the client applications 12 Internet access. Each of the messages is transmitted to the ground stations 24 by a selected communication interface which may comprise, for example, Swift-Broadband (SSB) SATCOM 16, Broadband Off-board Satellite Services (BOSS) 18 which operate in the Ku band, a packet-switched cellular network link 20 such as GSM, or other form of wireless network link 22 such as an IEEE 802.11 or 802.16 wireless LAN. Each of the client applications 12 has a separate address on the LAN 14. A communication management controller (CMC) 38 manages the routing of messages to and from the client applications 12 and implements a predetermined routing policy using, for example, ACARS message routing. The CMC 38 may also control the routing of messages using legacy communication interfaces 40, such as VHF and HF. Each of the communication interfaces 16,18,20,22 has associated therewith a routing daemon 42,44,46,48 which functions to route messages to the associated communication interface 16,18,20,22.

Messages generated by the client applications 12 that are intended to be transmitted to the ground stations 24 may have header information indicating the purpose of the message, the destination of the message, the priority of the message and whether there are any routing restrictions. The CMC 38 receives messages from the client applications 12 and queues these messages for transmission based on the routing policies, and any route restrictions contained in the message header. The message may also contain information specifying the particular communication interface 16,18,20,22 that is to be used to transmit the message, and the routing policies of the CMC 38. The CMC 38 delivers the messages to the routing daemons 42,44,46,48 based on the communication interface specified in the message. The routing daemons 42,44,46,48 may comprise software programs, programmed firmware or hard coding (i.e. hardware). Upon receipt of a message, the routing daemon 42,44,46 48 automatically routes the message to the associated communication interface 16,18,20,22, which in turn transmits the message through a ground based gateway 26 to a ground station 24.

One of the routing daemons 42,44 46,48 may be provided for each computer having an Ethernet interface, which is used for messaging by each of the client applications 12. The routing daemons 42,44,46,48 may run on one or more computers connected to the network 14. Each of the routing daemons 42,44,46,48 is assigned to service one or more IP interfaces (IP address and port) on each computer on the network 14 which is used for messaging. Depending upon performance characteristics, one or more of the routing daemons 42,44,46,48 may be resident on a single computer, each of which services one or more IP interfaces.

As previously mentioned, each IP interface is associated with a particular communication interface 16,18,20,22. Messages intended to be delivered to a ground station 24 (as determined by the application's specific routing policy) are sent to the routing daemon 42,44,46,48 for that interface for processing and delivery. Messages received from off-board senders over a particular interface may be handled and forwarded from the routing daemon 42,44,46,48 associated with that IP interface to the CMC 38. The CMC 38 interprets the header in the message, and then forwards the message to one of the client application 12, consistent with the header information.

Each of the routing daemons 42,44,46,48 is attached to the network 14 and is resident on a computer (not shown) having an operating system capable of supporting multiple IP addresses on a single network interface or an application capable of communicating over multiple source port numbers (not shown). The host computer may be reachable via packet routing from the messaging application 12 and may also be able to reach the appropriate communication interface 16,18, 20,22 via packet routing.

The CMC 38 manages digital data and permits sending and receiving ACARS messages between the aircraft 10 and ground stations 24. The messages that are sent and/or received by the CMC 38 are essentially complete files, rather than packets of data, defined by complete strings of characters having a header defining the destination of the message. The message follows IP protocol and is structured in a file transfer protocol. The CMC 38 essentially functions as a message broker service which delivers the messages as cohesive strings, rather than multiple packets, to a communication interface 16,18,20,22 which transmits the messages in multiple packets that are later reassembled on the ground into complete strings or messages.

Figure 2:
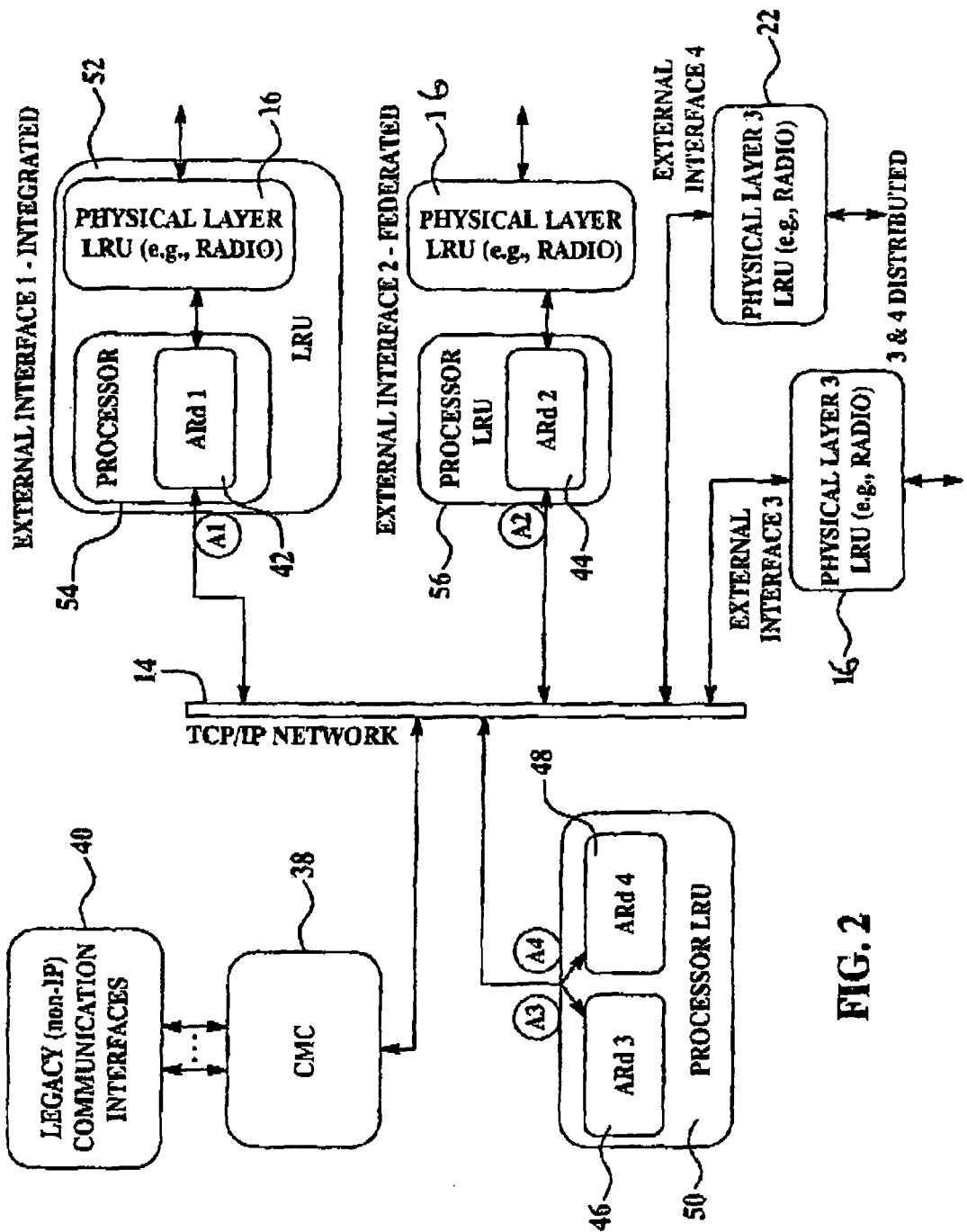
FIG. 2 is an illustration showing alternate system architectures using the routing daemons forming part of the system shown in FIG. 1.

Referring also to FIG. 2, the routing daemons 42,44,46,48 are distributed within the network 14 and may be resident on one or more computer processors, using any of several alternative forms of architecture. For example, the line replaceable unit (LRU) 52 contains a processor 54, which may be a computer, and a radio 16. Routing daemon 42 having an address "A1" is resident on processor 54. The LRU 52 represents an integrated architecture in which the routing daemon 42, processor 54 and one of the communication interfaces 16,18,20,22 shown in FIG. 1, e.g. SATCOM radio 16 are integrated into a single unit.

A federated architecture may be employed in which a routing daemon such as routing daemon 44 having an address "A2" is resident on a processor 56 forming an LRU that'is directly connected to one (e.g., SATCOM radio 16) of the communication interfaces 16,18,20,22 shown in FIG. 1. Another form of architecture may be employed in which the routing daemons are both distributed and separated from the communication interfaces. An example of this distributed architecture is represented by routing daemons 46, 48 that are resident on a processor 50 which may comprise a LRU. In this case, routing daemons 46, 48 have network addresses "A3" and "A4", respectively. Routing daemon 46 is dedicated to routing messages to e.q., the SATCOM radio 16 which forms a separate LRU. Similarly, routing daemon 48 is dedicated to sending messages to a physically separate communication interface e.q., a radio 22.

Thus, from the above, it may be appreciated that the routing daemons 42,44,46,48 may be present on any of the computers that are connected to the network 14, and either physically separate or combined with the communication interface 16,18,20,22 to which the message is routed.

Figure 3:
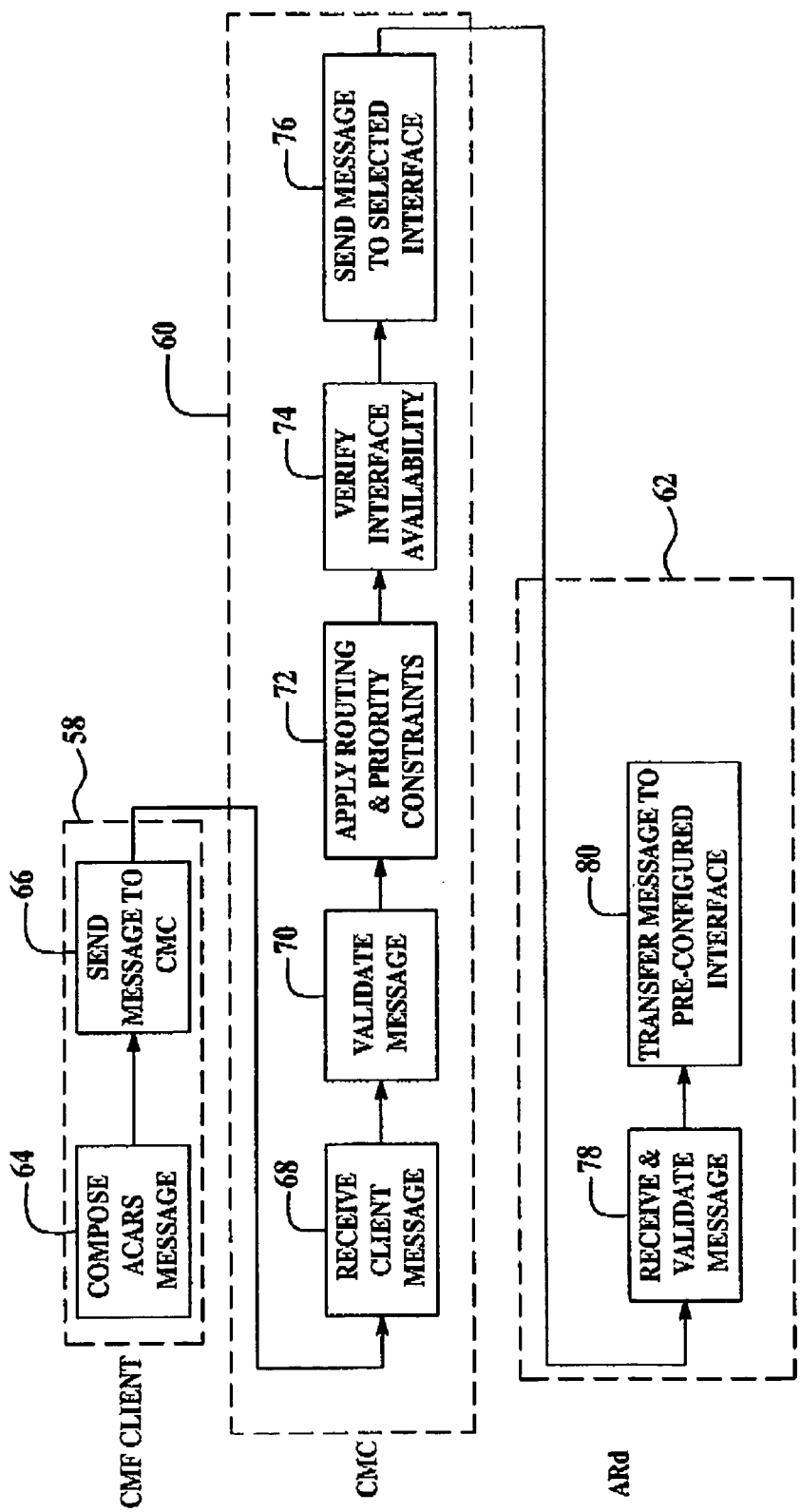
FIG. 3 is a flow chart illustrating steps of a method for sending messages from the aircraft to the ground using the communication routing system illustrated in FIG. 1.

Attention is now directed to FIG. 3 which depicts basic steps that may be used to carry out a method for distributed application communication routing according to an embodiment of the disclosure. The initial steps 58 of the method are carried out within one of the client applications 12 (FIG. 1). At step 64, the message is composed, which in the illustrated embodiment, is an ACARS message. Next, at step 66, the composed ACARS message is sent to the CMC 38 over the network 14.

The next series of steps shown by the numeral 60 are carried out by the CMC 38. The ACARS message composed by the client 12 is received at the CMC 38 at step 68. The CMC 38 then validates the message, at step 70. Using a preprogrammed protocol, the CMC 38 applies routing and priority constraints to the message at step 72. Then, at step 74, the CMC 38 verifies the availability of one of the communication interfaces 16,18,20,22. Assuming that the communication interface 16,18,20,22 is available for sending the message, the CMC 38 sends the message to the selected interface, as shown at step 76.

The final series of steps 62 are performed by the routing daemon 42,44,46,48 that is associated with the selected communication interface and which has been addressed by the CMC 38. At step 78, the routing daemon 42-48 receives and validates the message. Then, at step 80, the routing daemon 42-48 transfers the message to the preconfigured, communication interface 16, 18, 20, 22 which transfers the message via a gateway 26 on the ground to a destination such as a ground station 24 (see FIG. 1).

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of transmitting non-public messages from an airborne aircraft to a ground station using an improved ACARS (Aircraft Communications Addressing and Routing System), comprising the steps of:
   (A) generating a standard internet protocol (IP) based message on-board the aircraft by a client comprising an IP-based local area network (LAN) on the aircraft, said standard IP based message generated by an application associated with said client and said standard IP based message including a header;
   (B) associating a respective one of a plurality of routers with a respective one of a plurality of communication interfaces, each of said communication interfaces comprising a packet based radio communication interface, each of said plurality of routers servicing an IP interface associated with a respective one of a plurality of clients on said LAN;
   (C) assigning an address to each of the routers, said address corresponding to an address comprising said LAN;
   (D) said ACARS routing system validating said standard IP based message and selecting one of the communication interfaces for use in transmitting the standard IP based message from the aircraft to the ground station, said selecting determined by content provided by said client application within said standard IP based message and not determined by said LAN standard IP, said content including routing policies, priority information, and any route restrictions contained in the header of the standard IP based message;
   (E) sending the standard IP based message to the address of the router associated with the communication interface selected in step (D); and,
   (F) transmitting the standard IP based message from the aircraft to the ground station using the communication interface selected in step (D) using ACARS message routing.

2. The method of claim 1, wherein:
step (A) includes composing a the header for the standard IP based message, wherein the header indicates the purpose, destination, and priority of the standard IP based message, and step (D) includes inserting information into the header that identifies the selected communication interface.

3. The method of claim 1, wherein step (E) is performed using Transmission Control Protocol over Internet Protocol (TCP/IP).

4. The method of claim 1, wherein step (A) include structuring the standard IP based message in a file transfer protocol.

5. The method of claim 1, wherein step (E) is performed by sending the standard IP based message as a string of characters forming a file.

6. The method of claim 5, wherein step (F) includes transmitting the file to the ground station in a series of packets.

7. The method of claim 1, further comprising the step of:
   (G) assembling the packets into the file at the ground station.

8. The method of claim 1, further comprising the steps of:
   selecting a routing policy for routing the standard IP based messages based on preselected routing criteria; and,
   routing the standard IP based messages to the communication interfaces based on the selected routing policy.

9. A method of transmitting non-public messages from on-board a vehicle to an off-board location using an improved ACARS (Aircraft Communications Addressing and Routing System), comprising the steps of:
   (A) generating a standard internet protocol (IP) message within an IP-based local area network (LAN) by a client application on-board the vehicle, said standard IP message including a header;
   (B) said ACARS routing system validating said standard IP message and selecting one of a plurality of communication interfaces for use in transmitting the standard IP message from the vehicle to the off-board location, said selecting determined by content provided by said client application within said standard IP message and not determined by said LAN standard IP, each of said communication interfaces comprising a packet based radio communication interface, said content including routing policies, priority information, and any route restrictions contained in the header of the standard IP message;
   (C) sending the standard IP message over the LAN to an address of a respective one of a plurality of routers associated with the communication interface selected in step (B), said address corresponding to an address comprising said LAN, each of said plurality of routers servicing an IP interface associated with a respective one of a plurality of clients on said LAN;
   (D) routing the standard IP message to the communication interface selected in step (B) using the associated router; and,
   (E) transmitting the standard IP message from the vehicle to the off-board location using the communication interface selected in step (B) using ACARS message routing.

10. The method of claim 9, wherein step (C) is performed using Transmission Control Protocol over Internet Protocol (TCP/IP).

11. The method of claim 9, wherein step (A) includes composing a file containing the standard IP message and a header identifying the destination of the standard IP message.

12. The method of claim 9, wherein step (B) includes forming the header for the standard IP message and inserting information into the header that identifies the selected communication interface.

13. The method of claim 9, wherein step (C) is performed by sending the standard IP message over the LAN as a string of characters forming a file.

14. The method of claim 13, wherein step (E) includes transmitting the file to the off-board location in a series of packets.

15. The method of claim 9, further comprising the step of:
(F) assembling the packets into the file at the off-board location.

16. The method of claim 9, further comprising the steps of:
uniquely associating a respective one of said plurality of routers with a respective communication interface; and,
assigning a unique address to each router on the LAN.

17. The method of claim 9, further comprising the steps of:
selecting a routing policy for routing the standard IP message based on preselected routing criteria; and,
routing the standard IP message to the communication interface based on the selected routing policy.

18. A non-public communication system using an improved ACARS (Aircraft Communications Addressing and Routing System) for an aerospace vehicle including an airborne aircraft, comprising:
a standard internet protocol (IP) based local area network (LAN) on-board the vehicle;
at least one application on-board the vehicle connected to the LAN, the application generating standard IP based messages to be delivered to an off-board location, said standard IP based messages including a header;
a plurality of communication interfaces for delivering standard IP based messages from the vehicle to the off-board location using ACARS message routing, each of said communication interfaces comprising a packet based radio communication interface;
a plurality of router daemons respectively associated with each of the communication interfaces and each operative for routing messages using ACARS routing to the associated communication interface, each of the router daemons having an address on the LAN, each of said plurality of router daemons servicing an IP interface associated with a respective one of a plurality of applications on said LAN; and,
a communication manager programmed to validate said standard IP based message and selectively deliver said generated standard IP based messages from the application to the routing daemons and to a respectively associated communication interface based on the content provided by said application within said generated standard IP based messages and not based on said LAN standard IP, said content including routing policies, priority information, and any route restrictions contained in the header of the standard IP based message.

19. The communication system of claim 18, wherein at least one of the routing daemons includes a set of programmed instructions stored on-board the vehicle.

20. The communication system of claim 18, further comprising at least one computer on the LAN, and wherein at least one of the routing daemons includes software running on the computer.

21. The communication system of claim 18, wherein the communicating interfaces include at least one of:
a satellite communication system,
a wireless LAN,
a packet-switched cellular network.

22. The communication system of claim 18, wherein the communication manager includes a routing policy for governing the routing of messages to the routing daemons.

23. A non-public communication system using an improved ACARS (Aircraft Communications Addressing and Routing System) for delivering messages from an aircraft including an airborne aircraft to the ground, comprising:
a standard IP-based network on the aircraft using a transmission control protocol to transmit messages over the network;
at least one application coupled with the network and generating standard Internet Protocol-based messages to be sent to the ground, said messages including a header;
a plurality of communication interfaces each operative for delivering messages from the aircraft to the ground using ACARS message routing, each of said communication interfaces comprising a packet based radio communication interface;
a controller on-board the aircraft programmed to validate said standard Internet Protocol-based message and select one of the communication interfaces to be used to transmit a standard Internet Protocol-based message from the application to the ground, said selecting determined by the content provided by said application within said standard Internet Protocol-based messages and not determined by said standard IP-based network protocol, said content including routing policies, priority information, and any route restrictions contained in the header of the standard Internet Protocol-based message; and,
a plurality of addressable routers each respectively associated with a respective one of the plurality of communication interfaces, the routers being addressable by the controller to route messages to the associated communication interface for transmission to the ground using said ACARS routing, said router addresses associated with said IP-based network on the aircraft,
each of said plurality of routers servicing an Internet Protocol (IP) interface associated with a respective one of a plurality of applications on said local area network (LAN).

24. The communication system of claim 23, wherein each of the addressable routers comprises software.

25. The communication system of claim 23, wherein each of the addressable routers has a unique IP address on the network.

26. The communication system of claim 23, wherein the controller includes a routing policy for governing the routing of messages to the addressable routers.

* * * * *